(12) United States Patent  (10) Patent No.: US 7,534,194 B2
Eguchi et al.  (45) Date of Patent: May 19, 2009

(54) VEHICULAR TRANSMISSION

(75) Inventors: Takahiro Eguchi, Saitama (JP);
Yuichiro Takemori, Saitama (JP);
Toshikazu Uneyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 11/543,094

(22) Filed: Oct. 5, 2006

(65) Prior Publication Data

US 2007/0082782 A1    Apr. 12, 2007

(30) Foreign Application Priority Data

Oct. 6, 2005    (JP)    ............ P2005-293484

(51) Int. Cl.
*B60W 10/00*    (2006.01)
*F16H 59/30*    (2006.01)

(52) U.S. Cl. .................................. 477/77; 477/121

(58) Field of Classification Search ............ 477/77, 477/115, 121, 156
See application file for complete search history.

(56) References Cited

U.S. PATENT DOCUMENTS 7,243,010  B2 *   7/2007   Tabata et al. ................ 701/22

7,347,802  B2 *   3/2008   Tatara et al. ................. 477/5

FOREIGN PATENT DOCUMENTS

| JP | 52-27958 | | 3/1977 |
|---|---|---|---|
| JP | 60-24836 | U | 2/1985 |
| JP | 60-220252 | A | 11/1985 |
| JP | 60-256662 | A | 12/1985 |
| JP | 04-231765 | A | 8/1992 |
| JP | 59-013154 | A | 1/1994 |
| JP | 2001-050384 | A | 2/2001 |
| JP | 2001324005 | A | * 11/2001 |

* cited by examiner

*Primary Examiner*—Tisha D Lewis
(74) *Attorney, Agent, or Firm*—Arent Fox LLP.

(57) ABSTRACT

A vehicular transmission comprises an electrical control unit ECU, which controls to bring a starting clutch into loose engagement for a predetermined time while a deactivated cylinder mode is being terminated. The electrical control unit also estimates, during this predetermined time, an estimated PB, which is an estimated pressure inside the intake pipe, on the basis of a rotational speed Ne at the output shaft of the engine and of an opening TH at the throttle valve, and it then estimates or calculates the driving torque generated by the engine on the basis of this estimated PB and the rotational speed Ne. From this calculated driving torque, the electrical control unit sets respective pressures to be applied to a drive pulley and a driven pulley, which constitute a continuously variable transmission CVT.

7 Claims, 4 Drawing Sheets

VEHICULAR TRANSMISSION

FIELD OF THE INVENTION

The present invention relates to a vehicular transmission that transmits the driving force of an engine comprising a plurality of cylinders, to wheels through a ratio change mechanism. Furthermore, the present invention relates particularly to a vehicular transmission that is characterized by a control of a hydraulic pressure applied for the operation of the ratio change mechanism.

BACKGROUND OF THE INVENTION

Many automobiles are equipped with a transmission that generally includes such a ratio change mechanism, whose operation is controlled by applying a predetermined pressure of hydraulic oil (line pressure). For example, Japanese Laid-Open Patent Publication No. S60(1985)-256662 discloses a system that applies a hydraulic pressure into a hydraulic cylinder for controlling the width of a pulley, or more specifically, the force applied on the pulley pushing the belt in a belt-type continuously variable transmission. This control system operates to calculate the torque output from the engine on the basis of the rotational speed of the engine and of the pressure inside the intake pipe (negative pressure) and to set the hydraulic pressure in correspondence to the calculated torque value.

By setting the hydraulic pressure in correspondence to the torque output of the engine, it is possible that the engaging capacity of the clutch in the transmission, which is set also by the hydraulic pressure, be set to a minimum capacity required for transmitting the engine-output torque to the side toward the wheels. This can reduce the energy consumed by the engine for generating the hydraulic pressure and thereby improve the fuel efficiency of the vehicle. Moreover, this improves the operability and performance of the vehicle. Because the clutching capacity is limited to the minimum necessary for the transmission of the engine-output torque, the clutch can slip limiting the torque change while the output of the engine or the load of the driving vehicle is changing rapidly (for example, when the accelerator pedal is operated quickly or the vehicle goes over a curb). Furthermore, this attempt of making the pushing force applied to the belt minimum improves the durability of the belt and also facilitates miniaturization in designing the transmission.

In recent years, for the purpose of improving fuel economy, vehicles are equipped with an idling elimination control, in which the operation of the engine is stopped when the vehicle comes into a halt, or equipped with a partial cylinder operation control, in which, under certain driving conditions, some of the cylinders are deactivated or disengaged from the operation of the engine. The output of the engine is smaller while some of the cylinders are deactivated (this condition is referred to as "partial cylinder operation") than while all the cylinders are active or engaged in the operation (this condition is referred to as "complete cylinder operation"). Because of this reason, for example, Japanese Laid-Open Patent Publication No. S59(1984)-13154 discloses a method for increasing the speed ratio of a ratio change mechanism used with such an engine, which has cylinders that are deactivated in partial cylinder operation mode.

Problems to be Solved by the Invention

However, for the deactivated cylinders, the pressure in the intake pipe becomes the same as the atmospheric pressure notwithstanding how much the throttle valve is opened, so this condition causes the hydraulic pressure to be set excessively high because the hydraulic pressure is set in correspondence to the nominal driving torque of the engine, which is estimated from the pressure inside the intake pipe, which is excessively large as a suction pressure just when the cylinders, which have been deactivated, are reinstated into the operation of the engine. For achieving this excessively high hydraulic pressure, the hydraulic pump must be operated more powerfully than otherwise. This is one factor that degrades the fuel efficiency of the vehicle. Another problem is that such an excessively high hydraulic pressure can affect the durability of the transmission. Otherwise, for maintaining the durability against high hydraulic pressures, the rigidity of the transmission needs to be increased, but this can increase the weight and the manufacturing cost of the transmission.

SUMMARY OF THE INVENTION

To solve the above mentioned problems, it is an object of the present invention to provide a vehicular transmission that is advantageous in fuel efficiency.

Means to Solve the Problems

To achieve this objective, the present invention provides a vehicular transmission that comprises an engine, a ratio change mechanism, a controller, a intake pipe and a throttle valve. In the vehicular transmission, the engine includes a plurality of cylinders, and the ratio change mechanism transmits a rotational driving force from the engine with a speed change. The controller controls the operation of the ratio change mechanism, and the intake pipe is used for supplying air into the cylinders. The throttle valve is used for adjusting the air flow from the intake pipe to the cylinders. Furthermore, the engine is capable of operating in a deactivated cylinder mode where at least some of the cylinders are deactivated in the operation. The ratio change mechanism includes a frictionally engaging device, which can vary the torque being transmitted through the device, with the operations of the ratio change mechanism and the frictionally engaging device being controlled by application of hydraulic pressures. For terminating the deactivated cylinder mode, the controller controls the operation of the frictionally engaging device to bring the frictionally engaging device into loose engagement for a predetermined time while the cylinders that have been deactivated are being reinstated. During the predetermined time, the controller estimates a pressure inside the intake pipe on the basis of a rotational speed at the output shaft of the engine and an opening of the throttle valve, and then estimates a driving torque generated by the engine on the basis of the rotational speed and the estimated pressure inside the intake pipe. Based on this estimated driving torque, the controller sets a hydraulic pressure that is applied in operational control of the ratio change mechanism.

In the above described invention, it is preferable that the controller compare the estimated driving torque and the transmitted torque of the frictionally engaging device, which is in loose engagement, and set the hydraulic pressure applied in operational control of the ratio change mechanism on the basis of the larger of these two torques, i.e., the estimated driving torque and the transmitted torque.

Furthermore, in the above described invention, it is preferable that the ratio change mechanism be a belt-type continuously variable transmission, which comprises a drive pulley, whose pulley width is variable, a driven pulley, whose pulley width is variable, a V-belt, which is disposed around the drive pulley and the driven pulley, a drive side actuator, which varies the pulley width of the drive pulley, and a driven side actuator, which varies the pulley width of the driven pulley. In the belt-type continuously variable transmission, the drive side actuator and the driven side actuator are used for varying the pulley widths of the drive and driven pulleys, respectively, so that the respective pitch diameters of the drive and driven pulleys will vary accordingly to achieve a desired speed ratio, and the operations of the drive side actuator and the driven side actuator are controlled by applying respective hydraulic pressures. These hydraulic pressures, which are applied to the drive side actuator and the driven side actuator, respectively, comprise the above mentioned hydraulic pressure applied in operational control of the ratio change mechanism.

Advantageous Effects of the Invention

According to the present invention, the pressure inside the intake pipe is estimated on the basis of the rotational speed at the output shaft of the engine and the opening of the throttle valve for a predetermined time while the cylinders that have been deactivated are being reinstated, and then the driving torque generated by the engine is estimated on the basis of these rotational speed and estimated pressure. This estimated driving torque by the engine never becomes excessively large, so the hydraulic pressure that is set in correspondence to this driving torque will never be set higher than necessary. Therefore, the hydraulic pump is protected against being driven excessively or wastefully, so fuel economy is improved. As the increase in the hydraulic pressure is restricted in this way, the durability of the transmission is also improved, so it is even possible to design the transmission in a lighter body and to lower the manufacturing cost.

If the pressure of the intake pipe is estimated from the opening of the throttle valve as in this case, then the precision at which the driving torque of the engine is estimated can be a little imprecise. However, this does not present any problem because the estimated driving torque and the transmitted torque of the frictionally engaging device, which is in loose engagement, are compared, and the larger of the two, i.e., the estimated driving torque and the transmitted torque, is used for setting the pressure applied in operational control of the ratio change mechanism. This method allows the lower limit of the driving torque to be set by the transmitted torque of the frictionally engaging device. As a result, a prevention can be provided against any harmful effect that may otherwise arise if the driving torque of the engine is estimated lower than actual.

If the ratio change mechanism preferably comprise a belt-type continuously variable transmission, which includes a V-belt disposed around a drive pulley and a driven pulley, then the hydraulic pressures applied to the pulleys never become excessively high. This prevents the V-belt from being pushed by forces that are larger than necessary, so the durability of the V-belt will be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

MOST PREFERABLE EMBODIMENTS OF THE INVENTION

Figure 1:
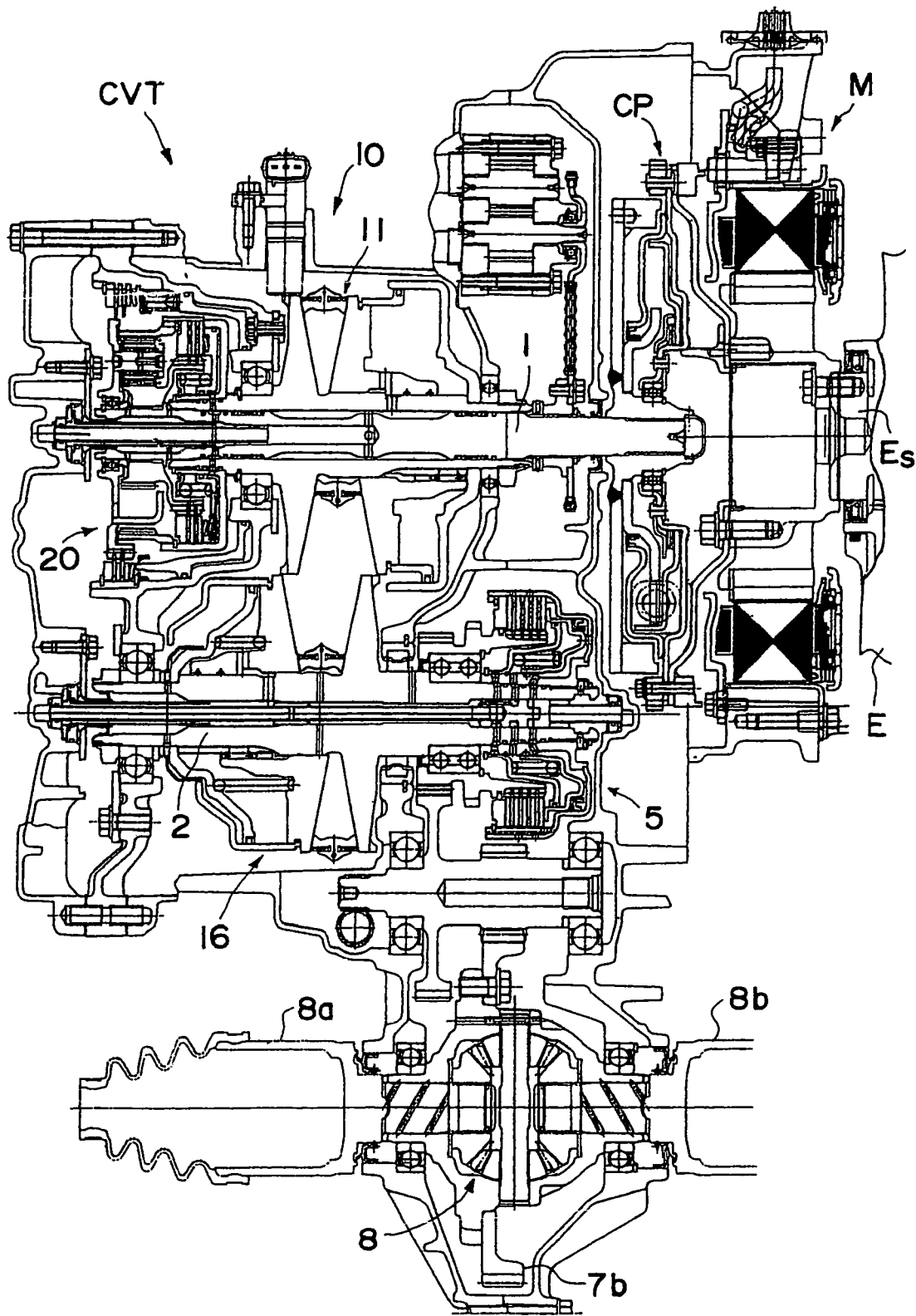
FIG. 1 is a sectional view describing the construction of a vehicular transmission according to the present invention.
Figure 2:
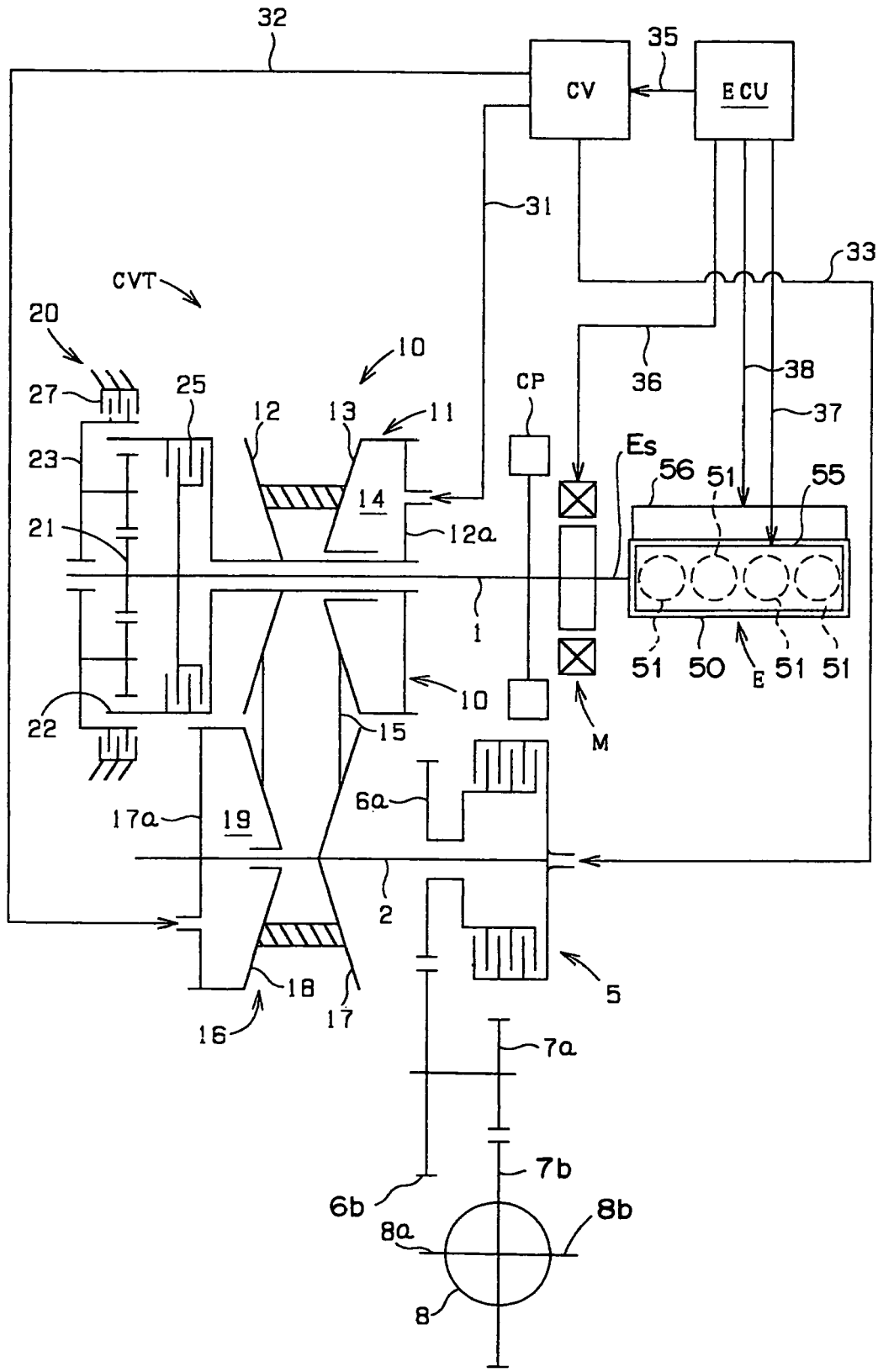
FIG. 2 is a schematic diagram describing the transmission system of the above mentioned transmission.

A preferred embodiment according to the present invention is described in reference to the drawings. FIG. 1 is a sectional view describing the construction of a vehicular transmission according to the present invention, and FIG. 2 shows the transmission system of this transmission. It is clear from these drawings that this transmission comprises an engine E, an electrical motor generator M, which is disposed on the output shaft Es of the engine E, and a continuously variable transmission CVT, which is connected through a coupling mechanism CP to the output shaft Es of the engine.

Figure 3:
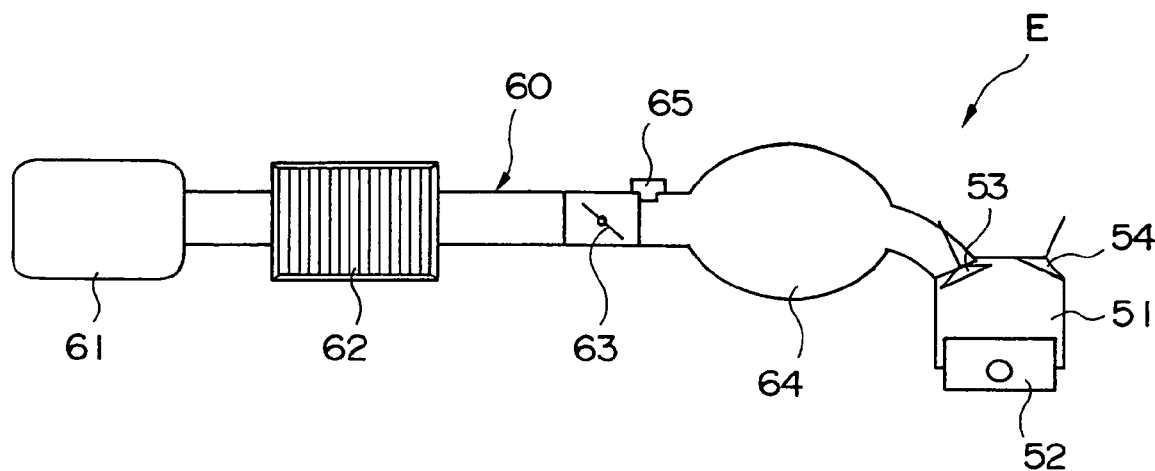
FIG. 3 is a schematic diagram describing a suction system used for the engine.

The engine E is a four cylinder reciprocating engine and has a piston 52 (refer to FIG. 3) in each of the four cylinder bores 51 formed in a cylinder block 50. The engine E is also equipped with a suction and exhaust controller 55, which controls the operation of the suction valve 53 and the exhaust valve 54 (refer to FIG. 3) for each cylinder bore 51, and equipped with a fuel injection and ignition controller 56, which controls the injection of fuel and the ignition for each cylinder bore 51. As shown schematically in FIG. 3, the engine E is provided with a intake pipe 60, which lets outside air flow into each cylinder bore 51. The intake pipe 60 comprises an air cleaner 61, through which the outside air is sucked, an intercooler 62, which cools the air taken in through the air cleaner 61, a throttle valve 63, which adjusts the air flow into the cylinder bores 51, an intake manifold 64, which leads the air from the throttle valve 63 into the cylinder bore 51, a pressure sensor 65, which is used for measuring the pressure inside the intake pipe 60 (intake manifold 64), and so on.

The electrical motor generator M assists the driving force of the engine when it is powered by a battery incorporated in the vehicle, and it charges the battery by generating electricity from the rotational drive received from the wheel side while the vehicle is being decelerated (energy recovery). Thus, this transmission, which is an embodiment according to the present invention, has a hybrid-type drive source.

As shown in FIGS. 1 and 2, the belt-type continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. The continuously variable transmission CVT is mounted on the vehicle, with the input shaft 1 being connected through the coupling mechanism CP with the output shaft Es of the engine. The driving force output from the transmission is transmitted through the starting clutch 5 to a differential mechanism 8 for driving right and left axle shafts 8a and 8b with wheels (not shown).

The metal V-belt mechanism 10 comprises a drive pulley 11, which is disposed rotatable over the input shaft 1, a driven pulley 16, which is fixed on the countershaft 2 as a one-piece rotating body, and a metal V-belt 15, which is disposed around these pulleys 11 and 16. The drive pulley 11 comprises a stationary pulley half 12, which is stationary in the axial direction but rotatable with respect to the input shaft 1, and a movable pulley half 13, which is movable axially with respect to the stationary pulley half 12. On the lateral outside of the movable pulley half 13, a drive-pulley cylinder chamber 14 is defined by a cylinder wall 12a, and a pulley-control pressure supplied through a control valve CV and through an oil passage 31 into the cylinder chamber 14 generates a thrust that shifts the movable pulley half 13 in the axial direction.

The driven pulley 16 comprises a stationary pulley half 17, which is fixed on the countershaft 2, and a movable pulley half 18, which is movable axially with respect to the stationary pulley half 17. On the lateral outside of the movable pulley half 18, a driven-pulley cylinder chamber 19 is defined by a cylinder wall 17a, and a pulley-control pressure supplied through the control valve CV and through an oil passage 32 into the cylinder chamber 19 generates a thrust that shifts the movable pulley half 18 in the axial direction.

In this construction, the hydraulic pressures being applied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference in these lateral thrusts, so that the groove widths of these pulleys will change, adjusting the pitch radii of the respective pulleys for the V belt 15. In this way, the speed change ratio of the transmission is controlled to vary continuously without any step. These lateral thrusts, which are generated in the drive and driven pulleys for the ratio control, are generated from a line pressure that is adjusted by a regulator valve from the pressure of a hydraulic pump (not shown) driven by the engine E. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same rotational direction as the input shaft 1 (i.e., in the forward direction of the vehicle). On the other hand, when the reverse brake 27 is engaged instead, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engaging operation of the forward clutch 25 and the reverse brake 27 is controlled with a forward/reverse control pressure that is adjusted by the control valve CV from the line pressure.

The starting clutch 5 is a clutch for controlling the transmission between the countershaft 2 and the output members of the transmission, i.e., transmission gears 6a, 6b, 7a and 7b. While the starting clutch 5 is in engagement, the output of the engine, after undergoing the speed ratio change by the metal V-belt mechanism 10, is transmitted through the transmission gears 6a, 6b, 7a and 7b to the differential mechanism 8, where it is divided and then transmitted to the right and left axle shafts 8a and 8b and to the wheels. While the starting clutch 5 is in disengagement, this transmission is not possible, and the transmission is in neutral condition. The engaging operation of the starting clutch 5 is controlled with a clutch-control pressure that is adjusted by the control valve CV from the line pressure and supplied through an oil passage 33.

In this continuously variable transmission CVT, which is constructed as described above, the pulley-control pressures supplied to the drive and driven pulleys from the control valve CV through the oil passages 31 and 32, respectively, are used for the speed ratio change control executed in the transmission while the forward/reverse control pressure supplied to the forward clutch 25 or to the reverse brake 27 from the control valve CV through oil passages (not shown) is used for the forward/reverse switching control of the transmission. In addition, the clutch-control pressure supplied from the control valve CV through the oil passage 33 is used for the engaging control of the starting clutch. The operation of the control valve CV itself is controlled by means of control signals sent from an electrical control unit ECU.

In the vehicle, which incorporates this transmission, the electrical motor generator M assists the driving force of the engine E, so that the engine E can operate in a range which is most fuel efficient. This improves the fuel efficiency of the vehicle, and for this purpose, the operation of the electrical motor M is controlled by means of control signals sent from the electrical control unit ECU through a control line 36. Simultaneously, the speed change ratio of the transmission is controlled for achieving an optimal ratio that makes the operation of the engine E as fuel efficient as possible. This control is also executed by means of control signals sent from the electrical control unit ECU to the control valve CV, but through another control line 35.

Furthermore, the engine E is designed for partial cylinder operation mode, where some of the four cylinders (cylinder bores 51) or all of them are deactivated when a predetermined condition is satisfied for the vehicle (for example, the engine is idling or decelerating). More specifically, while the electrical control unit ECU controls the operation of the suction and exhaust controller 55 with control signals sent through a control line 37 and controls the operation of the fuel injection and ignition controller 56 through a control line 38, to operate the engine in a partial cylinder operation mode, it keeps suction and exhaust valves being closed for some or all of the cylinder bores 51 and inhibits these cylinders from receiving fuel injection and ignition. By operating the engine in this way, the fuel efficiency of the vehicle is improved especially during the vehicle's deceleration.

Figure 4:
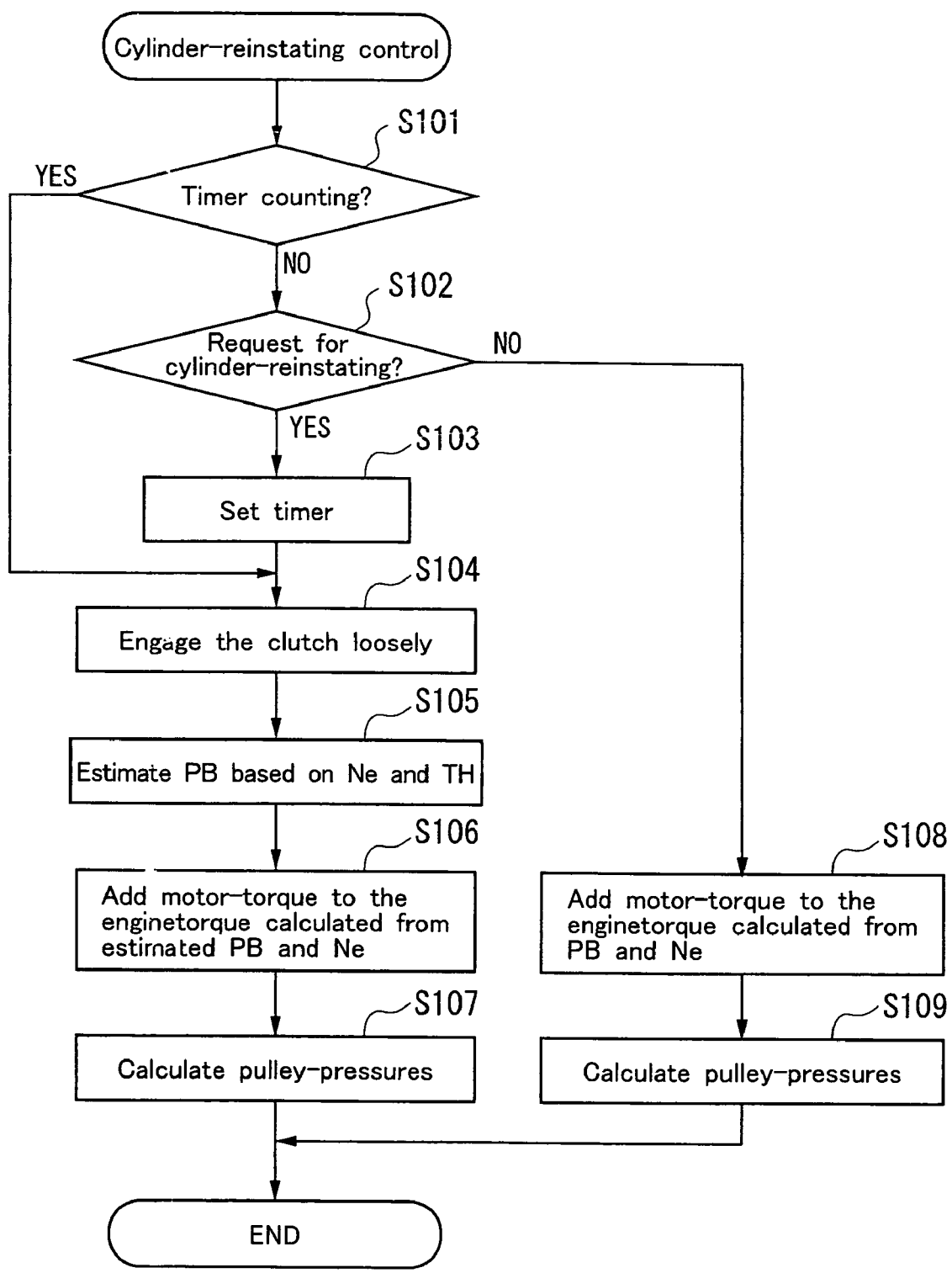
FIG. 4 is a flowchart showing control steps executed for reinstating or activating again the cylinders that have been deactivated in the above mentioned transmission.

In the vehicular transmission, which has the above described construction, the electrical control unit ECU controls to reinstate the cylinders that have been deactivated in the above mentioned partial cylinder operation mode. Here, this control is referred to as "cylinder-reinstating control" and executed as described in the following in reference to the flowchart on FIG. 4. In the cylinder-reinstating control, at first, a determination is made at step S101 whether a predetermined timer is counting or not. If the result of the determination at step S101 is "No", then the control flow proceeds to step S102. If the result is "Yes", then the flow proceeds to step S104.

At the second step, i.e., step S102, a determination is made whether a predetermined request for reinstating the cylinders that have been deactivated is made or not (this request is hereinafter referred to as "cylinder-reinstating request"). A cylinder-reinstating request is made, for example, if the torque requested for the engine E, which is calculated from the amount of displacement of the accelerator pedal, is larger than a predetermined value, or if the remaining charge in the battery becomes smaller than a predetermined value while the vehicle is driven solely by the electrical motor generator M with all the cylinders of the engine being deactivated. A signal that represents a cylinder-reinstating request is input into the electrical control unit ECU. If the result of the determination at step S102 is "Yes", then the control flow proceeds to the next step, i.e., step S103. If the result is "No", then it proceeds to step S108.

At step S103, the timer is set, and the counting is started. Specifically, the timer is set at, for example, 0.5 second, and the timer starts counting down. Then, the control flow proceeds to step S104.

At step S104, the electrical control unit ECU controls the engaging operation of the starting clutch 5 to loosen its engagement or to bring the starting clutch 5 into loose engagement (by lowering the pressure actuating the starting clutch 5). When the starting clutch 5 has come into loose engagement, each cylinder (cylinder bore 51) is reinstated into its active state. The electrical motor generator M assists with torque until the cylinders of the engine E that have been inactive but now are active become sufficiently effective in generating engine torque. While the driving torque by the engine E is being gradually increased by gradually opening the electrically controlled throttle valve (not shown) and by gradually reducing the retardation time for ignition from its maximum, the driving torque by the electrical motor generator M is gradually decreased accordingly. The transition that reinstates the cylinders is executed not to allow any rapid increase in the driving torque by the engine E, so that there will be no shock, which could otherwise be experienced. Then, the control flow proceeds to step S105.

At step S105, an estimation is made on the basis of the rotational speed Ne at the output shaft Es of the engine and the opening TH of the throttle valve 63 for an estimated PB, which is an estimated pressure inside the intake pipe 60 of the engine E. Values for the estimated PB are experimentally predetermined against values of the rotational speed Ne and those of the throttle opening TH and are stored in memory as a data map. From the data map, the value for the estimated PB is retrieved in correspondence to the rotational speed Ne and the opening TH, which are detected at the moment. Then, the control flow proceeds to step S106.

At step S106, the driving torque TE1 solely by the engine E is estimated on the basis of the rotational speed Ne and the estimated PB, and the driving torque TM solely by the electrical motor generator M is estimated from the drive command value that is directing the electrical motor generator M. Then, these estimated driving torques TE1 and TM are summed up for calculating an estimated driving torque TA1 at the input shaft 1. Values for the driving torque TE1 solely by the engine E are experimentally predetermined against values of the rotational speed Ne and those of the estimated PB and are stored in memory as a data map. From the data map, the value for the driving torque TE1 is retrieved in correspondence to the rotational speed Ne and the estimated PB at the moment. Then, the control flow proceeds to step S107.

At step S107, a comparison is made between the estimated driving torque TA1, which is calculated as described above, and the torque transmitted through the starting clutch 5, which is in loose engagement. Based on the larger of the two, i.e., the estimated driving torque TA1 and the transmitted torque of the starting clutch 5, calculations are made for setting the pressures being supplied to the drive and driven pulleys in the continuously variable transmission CVT. Values for the pressures to be supplied to the drive and driven pulleys are predetermined against values of the driving torque and are stored in memory as a data map. From this data map, the values for the drive and driven pressures are retrieved in correspondence to the torque at the moment. Then, the process ends.

For the calculation of the transmitted torque of the starting clutch 5, a torque capacity coefficient is calculated from a predetermined torque capacity map in correspondence to the throttle opening TH of the throttle valve 63 and the speed ratio of the clutch, and then a base torque is calculated by multiplying the torque capacity coefficient by a correction coefficient that accords with the rotational speed Ne at the output shaft Es of the engine and the shift range. The transmitted torque of the starting clutch 5 is calculated by multiplying the base torque by the speed ratio of the continuously variable transmission CVT.

On the other hand, if the result of the determination at step S102 is "No", then the control flow proceeds to step S108. Here, the driving torque TE2 solely by the engine E is calculated similarly to that executed at step S106 on the basis of the rotational speed Ne and the real PB, i.e. the pressure inside the intake pipe 60 measured by the pressure sensor 65, and the driving torque TM solely by the electrical motor generator M is estimated from the drive command value. These driving torques TE2 and TM are summed up for calculating an estimated driving torque TA2 at the input shaft 1. Then, the control flow proceeds to step S109.

At step S109, a comparison is made similarly to that executed at step S107 between the estimated driving torque TA2, which is calculated as described above, and the torque transmitted through the starting clutch 5, which is in loose engagement. Based on the larger of the two, i.e., the estimated driving torque TA2 and the transmitted torque of the starting clutch 5, calculations are made for setting the pressures being supplied to the drive and driven pulleys in the continuously variable transmission CVT. Then, the process ends.

For applying the pressures to the drive and driven pulleys at these calculated values, the electrical control unit ECU controls the operation of the control valve CV to produce an appropriate line pressure.

As described above, the vehicular transmission estimates the PB, which is the pressure inside the intake pipe, on the basis of the rotational speed Ne at the output shaft Es of the engine and the opening TH of the throttle valve 63 for a predetermined time (being counted by the timer) while the cylinders that have been deactivated are being reinstated, and it estimates the driving torque TA1 by the engine E and (the electrical motor generator M) on the basis of the rotational speed Ne and the estimated PB. In this way, the estimated driving torque by the engine never becomes excessively large, so the hydraulic pressure (i.e., the pressures applied to the drive and driven pulleys) is never set larger than necessary. This means the hydraulic pump never operates wastefully, so the fuel efficiency is improved. As the vehicular transmission restricts increase in the hydraulic pressure in this way, the durability of the continuously variable transmission CVT is improved. Therefore, it is possible to design the transmission with a lighter body and to lower the manufacturing cost.

If the pressure is estimated from the opening TH of the throttle valve 63, then the precision at which the driving torque of the engine E is estimated can be a little imprecise. However, this does not lead to any problem because the estimated driving torque TA1 and the torque transmitted through the starting clutch 5, which is in loose engagement, are compared, and the larger of the two, i.e., the estimated driving torque TA1 and the transmitted torque of the starting clutch 5, is used for setting the pressure operating the continuously variable transmission CVT (the pressures applied to the drive and driven pulleys). As a result, the lower limit of the driving torque can be set by the transmitted torque of the starting clutch 5, so that a prevention can be provided against any harmful effect that may otherwise arise if the driving torque of the engine E is estimated lower than actual. For example, slippage of the metal V-belt 15 can occur otherwise.

As described in the above embodiment, it is preferable that the transmission comprise a belt-type continuously variable transmission CVT, which includes a metal V-belt 15 disposed around a drive pulley 11 and a driven pulley 16. In this case, the hydraulic pressures supplied to the pulleys (the drive side pressure and the driven side pressure) never become excessively high, so the pushing forces acting on the metal V-belt 15 from the pulleys never become larger than necessary. This restraint improves the durability of the metal V-belt 15.

In the above described embodiment, the transmission comprises a belt-type continuously variable transmission CVT. However, it is not limited to this construction. The present invention can be embodied by using an automatic transmission (AT) whose operation is controlled hydraulically.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2005-293484 filed on Oct. 6, 2005, which is incorporated herein by reference.

What is claimed is:

1. A vehicular transmission comprising an engine, which includes a plurality of cylinders, a ratio change mechanism, which transmits a rotational driving force from said engine with a speed change, a controller, which controls operation of said ratio change mechanism, a intake pipe, through which air is supplied into said cylinders, and a throttle valve, which is used for adjusting air flow from said intake pipe to said cylinders, said engine capable of operating in a deactivated cylinder mode where at least some of said cylinders are deactivated;

wherein:

said ratio change mechanism includes a frictionally engaging device, which can vary a transmitted torque, and operations of said ratio change mechanism and said frictionally engaging device are controlled hydraulically;

said controller controls the operation of said frictionally engaging device to bring said frictionally engaging device into loose engagement for a predetermined time while the cylinders that have been deactivated are being activated again in the operation of said engine; and during said predetermined time, said controller estimates a pressure inside said intake pipe from a rotational speed at an output shaft of said engine and from an opening of said throttle valve, and then estimates a driving torque generated by said engine from the rotational speed of the output shaft of said engine and the estimated pressure inside said intake pipe, and said controller, on a basis of this estimated driving torque, sets a hydraulic pressure that is applied in operational control of said ratio change mechanism.

2. The vehicular transmission as set forth in claim 1, wherein:

said controller compares said estimated driving torque and said transmitted torque of said frictionally engaging device, which is in loose engagement, and sets said hydraulic pressure applied in operational control of said ratio change mechanism on a basis of the larger of these two torques.

3. The vehicular transmission as set forth in claim 1 or 2, wherein:

said hydraulic pressure to be applied in operational control is produced by a regulator valve that adjusts a hydraulic pressure from a hydraulic pump, which is driven by said engine.

4. The vehicular transmission as set forth in claim 1 or 2, wherein:

said ratio change mechanism is a belt-type continuously variable transmission, which comprises a drive pulley, whose pulley width is variable, a driven pulley, whose pulley width is variable, a V-belt, which is disposed around said drive pulley and said driven pulley, a drive side actuator, which varies the pulley width of said drive pulley, and a driven side actuator, which varies the pulley width of said driven pulley;

said drive side actuator and said driven side actuator make the pulley widths of said drive and driven pulleys to vary, respectively, so that respective pitch diameters of said drive and driven pulleys will vary accordingly to achieve a desired speed ratio;

said drive side actuator and said driven side actuator are operationally controlled by application of hydraulic pressures, respectively; and said hydraulic pressure applied in operational control of said ratio change mechanism comprises the hydraulic pressures applied to said drive side actuator and said driven side actuator, respectively.

5. The vehicular transmission as set forth in claim 1, wherein:

said frictionally engaging device comprises a hydraulic clutch, which is provided in said ratio change mechanism, and said hydraulic clutch controls said rotational driving force, which is transmitted from said engine through said ratio change mechanism toward wheels.

6. The vehicular transmission as set forth in claim 5, wherein:

said loose engagement is established by lowering a hydraulic pressure applied to said hydraulic clutch.

7. The vehicular transmission as set forth in claim 1, wherein:

said cylinders are brought into deactivation by keeping suction and exhaust valves closed and by inhibiting fuel injection and ignition for respective cylinder bores of said cylinders.

* * * * *